Feb. 25, 1964  G. W. FORDHAM  3,122,016
THERMOELECTRIC APPARATUS AND METHOD
Filed March 2, 1960  3 Sheets-Sheet 1

ATTEST
Charles F. Steininger

INVENTOR.
Glenn W. Fordham.
BY
ATTORNEY

INVENTOR.
Glenn W. Fordham.

United States Patent Office 3,122,016
Patented Feb. 25, 1964

3,122,016
THERMOELECTRIC APPARATUS AND METHOD
Glenn W. Fordham, Dallas, Tex., assignor to The Atlantic Refining Company, Philadelphia, Pa., a corporation of Pennsylvania
Filed Mar. 2, 1960, Ser. No. 12,321
4 Claims. (Cl. 73—154)

The present invention relates to an improved apparatus and method for measuring small temperature differences between two preselected points. In a more specific aspect, the present invention relates to an improved thermoelectric apparatus and method for measuring extremely small differential temperatures between two preselected points. In a still more specific aspect, the present invention relates to an improved thermoelectric apparatus for measuring extremely small differential temperatures between selected points below the surface of the earth.

There are many known methods and apparatuses for obtaining accurate temperature measurements and from such temperature measurements calculating small differences in temperature between two points. For example, resistance type thermometers, particularly negative coefficient resistors such as thermistors, as well as thermoelectric thermometers such as the thermocouple have heretofore been used. In the case of the resistance type thermometer, close calibration of the instrument is required; and it is often necessary to periodically recalibrate the instrument during use. In addition, the resistance type thermometer is extremely delicate; and slight strains on the resistance element will cause variations in the response of the instrument and require recalibration or replacement. Accordingly, such resistance type thermometers are best adapted for use in laboratory measurements where conditions can be closely controlled, frequent recalibration can be effected, and the resistance element itself can be adequately protected from damage. These same safeguards must be employed where the resistance type thermometer is to be employed for industrial purposes. Although the thermocouple or thermoelectric type thermometer is substantially more rugged than the resistance type thermometer, thus making it highly desirable in industrial uses, the thermocouple also has disadvantages which render it most suitable for use on a laboratory scale. Two major disadvantages of the thermocouple are the necessity of closely controlling and accurately measuring the temperature at the reference junction and the necessity of employing homogeneous wires to form the thermocouple. In the first instance, in order to determine the temperature at the measuring junction of a thermocouple as a function of the E.M.F., the reference junction must be maintained at some constant reference temperature, such as, 0° C. Appropriate conversion tables are available for reference temperatures other than 0° C., but in either case, accurate control of the reference junction temperature must be maintained and the actual maintained temperature must be known to a high degree of accuracy. In a laboratory, the maintenance of a constant reference temperature is effected by the use of an ice bath; whereas, in industrial applications, the reference temperature is maintained by placing the reference junction in a heated chamber. In any event, it is difficult to maintain or measure the reference temperature with a sufficient degree of accuracy to obtain temperature measurements at the measuring junction which are accurate to better than one-tenth of a degree. As to the second disadvantage of thermocouples, except possibly for copper, it is almost impossible to obtain thermocouple wires which are homogeneous throughout their length. If such wires are not homogeneous, a temperature gradient between one end of the wire and the other tends to set up "parasitic" E.M.F.'s. It is also theorized that those parasitic E.M.F.'s may be caused by chemical changes in the wire itself, by strains in the wire, or by other exterior forces. This problem becomes even more critical where the measuring junction of the thermocouple is located a considerable distance from the point at which the detecting equipment and reference junction are located and particularly where the temperature at the measuring junction differs radically from the temperature at the latter location.

The above described disadvantages of resistance type thermometers and conventional thermocouples make it impossible to exploit the advantages of temperature measurements in subsurface earth formations. In this particular application of thermometry, valuable information concerning the nature of comparatively deep subsurface anomalies can be applied to exploration for petroleum deposits. For example, in Patent No. 2,403,704 to Blau, a system of geothermal prospecting is described wherein temperature measurements are made in comparatively shallow bore holes spaced over an exploratory area; and the presence or absence of a comparatively deep subsurface anomaly conducive to the accumulation of petroleum can be detected. This exploration method is based on the fact that salt domes normally associated with the accumulation of petroleum are much better transmitters of thermal energy than are other types of rock formations. Accordingly, the temperature of the earth above a salt dome will be slightly higher than the temperatures over other types of rock formations or beyond the flanks of a salt dome. In order to make these temperature measurements, Blau suggests placing a thermometer in each bore hole below the point at which seasonal temperature variations will affect the measurements and plotting the measured temperatures to form a contour map of thermal variations. Blau, however, suggests no practical method for making temperature measurements since conventional thermometers are incapable of accurately measuring the small differences in temperature which will exist over a salt dome as opposed to temperatures measured beyond the flanks of a salt dome.

Similarly, Patent No. 2,676,489 to Basham describes a method for locating cement behind a casing in a bore hole wherein a temperature gradient over a selected vertical section is obtained by making two temperature measurements at vertically spaced points in the bore hole. Basham's temperature measurements are made with expensive, calibrated, resistance type thermometers such as thermistors. Here again sufficiently accurate measurements cannot be obtained at a low-cost and the downhole instrument must be protected to prevent damage to or strain on the resistance element.

It is, therefore, an object of the present invention to provide an improved apparatus and method for measuring small differences in temperature between spaced points.

A further object of the present invention is to provide an improved apparatus and method for measuring small differences in temperature between two spaced points under conditions where the sensing points are remotely located from the metering or recording station.

A further object of the present invention is to provide an improved thermocouple system for measuring small differences in temperature between two spaced points.

A further object of the present invention is to provide an improved thermocouple system in which the same measuring circuit can be used to accurately measure temperature differences between any number of two spaced points.

A further object of the present invention is to provide an improved thermocouple system for measuring small differences in temperature between two spaced points wherein the metering or recording circuit of the system may be spaced a considerable distance from the sensing points, and extreme differences in temperature may exist between the metering or recording location and the sensing points.

A further object of the present invention is to provide an improved thermocouple system for measuring small differences in temperature between two spaced points wherein the necessity of maintaining and accurately measuring the temperature of the reference junction is eliminated.

A further object of the present invention is to provide an improved thermocouple system in which only the voltage developed between the thermocouple junctions is measured.

A further object of the present invention is to provide an improved thermocouple system in which spurious E.M.F.'s developed in the measuring circuit are eliminated prior to measuring the temperature differential.

A further object of the present invention is to provide an improved thermocouple system in which the sensitivity of the measuring circuit is increased by bucking out the whole number value of the measured voltage and measuring the fractional value on a meter.

A further object of the present invention is to provide an improved thermocouple system and method for measuring small temperature differences beneath the surface of the earth.

These and other objects and advantages of the present invention will be apparent from the following detailed description. In order to simplify the following description, the thermocouple system of the present invention will be described with reference to its use in making temperature measurements below the surface of the earth. However, it is to be recognized that the thermocouple system of this invention may be employed in other industrial uses, some of which will be enumerated hereinafter.

Briefly described, applicant's invention is a method and means for utilizing a plurality of thermocouple junctions to accurately measure small temperature differentials in terms of minute voltages which are indicated at a position or positions removed from the thermocouple position. Because of the novel method of operation, applicant's device is able to accurately and economically measure these minute voltages (on the order of hundredths of microvolts) and obtain a temperature accuracy of ±.001° C. with a highly portable and dependable measuring device.

Basically, the method includes positioning two thermocouple junctions at the points to be measured (assuming only one differential is to be measured), selecting a dummy load whose resistance is equal to that of the thermocouple circuit, calibrating the measuring circuit by replacing the thermocouple circuit with the dummy load and eliminating measuring circuit spurious voltages simultaneously with the development of the desired measuring circuit sensitivity, replacing the dummy load with the thermocouple circuit, and obtaining an accurate measurement of the temperature differential between the two points by introducing a known bucking voltage equal to the whole number value of microvolts developed by the temperature differential, and measuring the fractional value of microvolts with the measuring circuit.

Any conventional depth measuring system can be used to place the thermocouple at the desired position or positions in the borehole. If desired, any conventional recording system can be used to record the temperature differential and/or the depth of the measurement.

Figure 1:
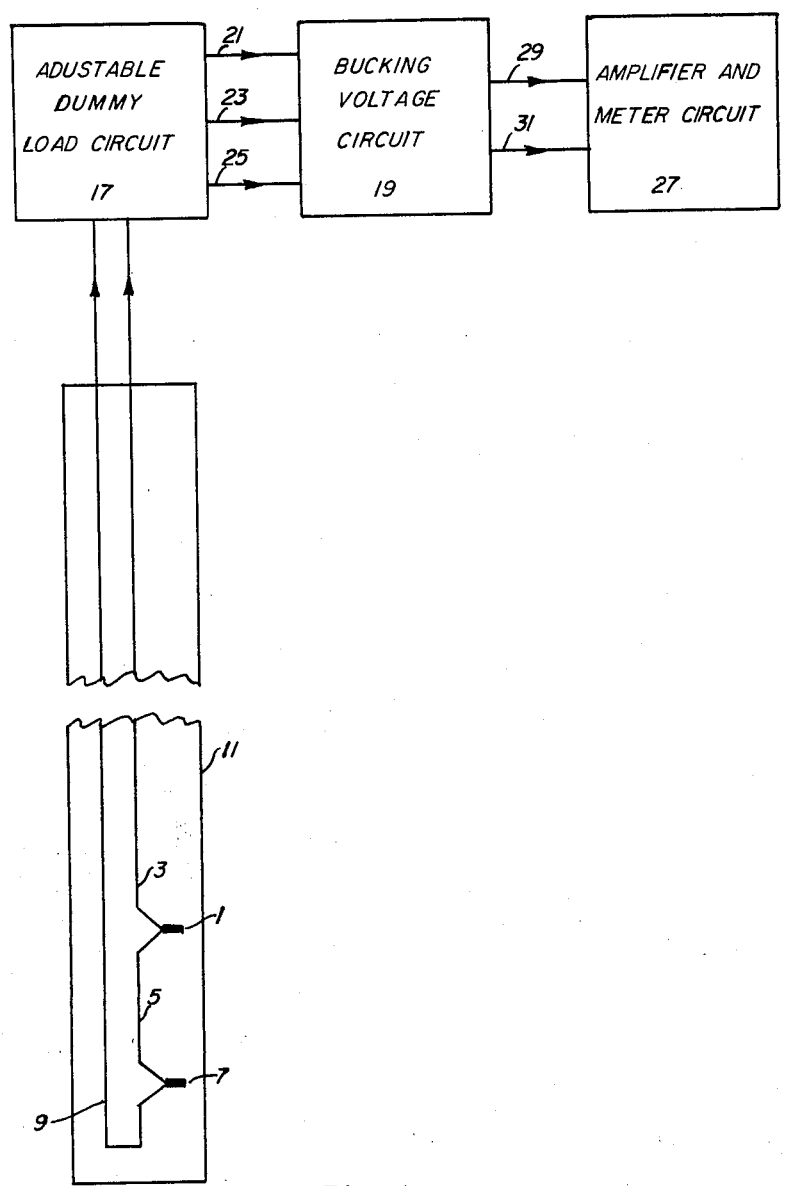
FIGURE 1 is a drawing of applicant's thermocouple and measuring circuits.

Reference is now made to FIGURE 1 which shows a thermocouple circuit positioned in a borehole and its measuring circuit in block form located at a distance remote from the borehole. The thermocouple circuit includes thermocouple junctions 1 and 7, wires 3, 5, and 9. The measuring circuit includes adjustable dummy load circuit 17, connected to bucking voltage circuit 19 by lead wires 21, 23, and 25 and D.C. amplifier-meter circuit 27 connected to circuit 19 by lead wires 29 and 31. It should be noted that blocks 17 and 19 can be consolidated into one container, thus improving over all accuracy and portability as will be described hereinafter.

Figure 2:
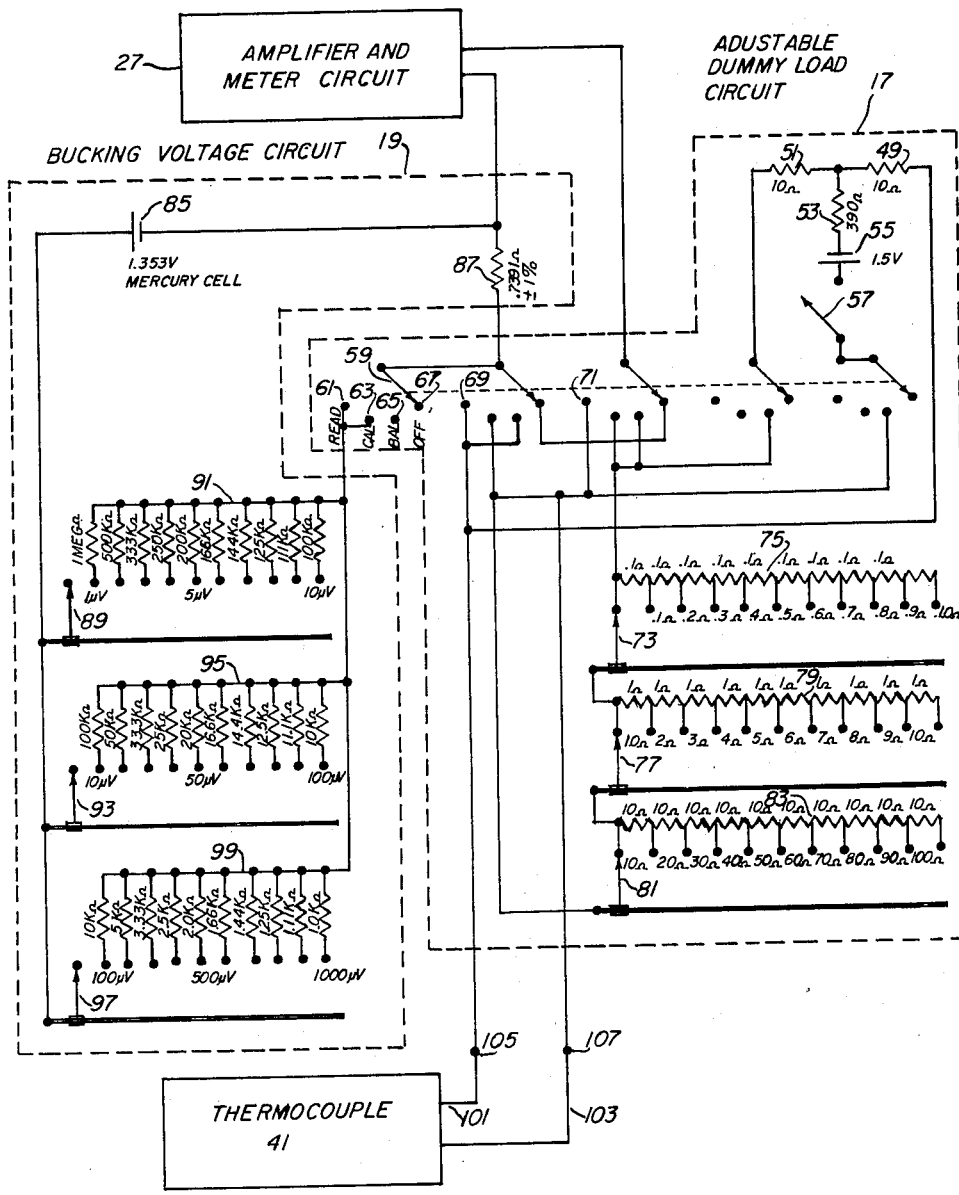
FIGURE 2 is a schematic diagram of a preferred embodiment of the thermocouple circuit and measuring circuit.

Let us first examine, broadly, the major elements of applicant's invention as shown in FIGURE 1, and then we will examine, in detail, the preferred embodiment as shown in FIGURE 2.

THERMOCOUPLE CIRCUIT

The thermocouple circuit as shown in FIGURE 1 includes thermocouple junction 1 made up of a joinder of wire 3 and wire 5, and thermocouple junction 7 made up of a joinder of wire 5 and wire 9. Wires 3 and 9 are also used to connect the thermocouple circuit to the measuring circuit to be discussed hereinafter. It should be noted that for best results, wires 3 and 9 should be continuous with no joinders. Junction 1 and junction 7 are placed at the positions of interest between which the temperature differential will be measured.

The purpose of the thermocouple circuit is to generate a voltage which is proportional to the temperature differential between the points of interest.

In accomplishing the purpose of the thermocouple circuit, it is necessary to overcome several problems peculiar to thermocouple circuitry. The voltage generated by the temperature differential is usually extremely small, amounting to only several microvolts. Since this voltage is so small, the existence of parasitic or spurious voltages created by other sources can completely mask the voltage created by the temperature differential between the points of interest. The presence of impurities in the circuitry and other temperature differentials are the principal sources of these masking voltages.

To overcome the parasitic voltages described above, applicant uses a pure metal, such as copper, in all circuitry possible; i.e., wires 3 and 9 (as well as in 21, 23, 25, 29, 31, and other circuitry to be described hereinafter). A less pure wire, such as constantan, is used in wire 5 over the shorter distance. It has been found that the temperature differential over which the shorter wire 5 is exposed is such that the impurities in wire 5 generate negligible parasitic voltage. Of course, wire 5 can extend over considerable distance (several hundred feet) if the temperature differential remains small. It should also be noted that other types of pure wire, well known to those skilled in the art, can be used as long as the less pure wire is substituted for wire 5 and the pure wire is substituted for wires 3 and 9 and the other critical wiring in the measuring circuit to be described hereinafter.

In addition to combating spurious voltage by the use of pure leads, applicant's use of two long leads of similar material usually affords an unexpected spurious voltage canceling action. That is, if the leads do contain impurities over a particular temperature differential, the voltages developed in the two leads tend to cancel each other.

It is clear from the discussion above that the application of applicant's thermocouple to exploration activities is a significant contribution to the state of the exploration art. The advantages of using this instrument and its measuring circuit as an exploration tool will be set forth in more detail hereinafter.

The preferred embodiment of the thermocouple circuit is shown in FIGURE 1 in which wires 3 and 9 are made of pure copper and wire 5 is made of constantan.

ADJUSTABLE DUMMY LOAD CIRCUIT

Block 17 is an adjustable dummy load circuit and is varied until its total resistance matches the total resistance of the entire thermocouple circuit.

The purpose of the adjustable dummy load is to provide an accurate and expeditious means for obtaining a resistance which is equivalent to the thermocouple circuit resistance and which can be easily connected across circuits 19 and 27 during the period in which parasitic voltages are being eliminated and the measuring circuit meter is being calibrated.

To be able to accurately record the minute voltages developed by the thermocouple circuit, the measuring circuit must be free from spurious voltages and the measuring circuit meter must be accurately calibrated as will be detailed in the section describing the bucking voltage circuit. The thermocouple circuit cannot be used in the above described operations since the voltage that it develops would prevent proper meter calibration and would also prevent the accurate elimination of spurious voltages. However, the resistance in the thermocouple circuit must be included in the measuring circuit to provide proper meter calibration and proper elimination of spurious voltages. Since the measuring circuit must be able to measure various thermocouple circuit voltages, it is necessary that a dummy load circuit be provided which is flexible enough to simulate the total resistance found in various types of thermocouple circuits; i.e., deep hole thermocouple circuits with a large total resistance and shallow hole circuits which will have less total resistance. In addition, it is necessary that the dummy load circuit be able to switch in and out of the remainder of the measuring circuit so that it is in the active part of the measuring circuit only during the period in which the thermocouple circuit is inactive; i.e., during the balancing and calibrating operation. Due to the minute voltages involved, it is necessary that no resistance be added or subtracted from the measuring circuit when the dummy load is substituted for the thermocouple circuit. Therefore, it is essential that the dummy load be capable of being switched into the metering circuit at the exact point at which the thermocouple circuit is connected to the measuring circuit.

To solve the above-mentioned problems, applicant has developed a novel dummy load circuit that can be quickly substituted for the thermocouple circuit by a switching means and which can be readily adjusted to match the resistance of any thermocouple circuit. The switching means allows the dummy load to be inserted into the remainder of the measuring circuit at the exact position of the thermocouple circuit. Various types of components can be used in applicant's adjustable dummy load circuit for matching the thermocouple resistance to the dummy load; i.e., an ohm meter and necessary switching equipment, a Wheatstone bridge, or any resistive measuring device and the required switching equipment as will be detailed hereinafter. It has been found that the Wheatstone bridge is desirable since with its use, the meter in the amplifier meter circuit can be utilized and the unit will have maximum flexibility with a minimum of additional equipment. Because of the possibility of introducing spurious voltage, experimentation has proven that the construction of the dummy load is very important to the proper operation of the over all measuring circuit. All circuitry in the input must be made of a pure metal and the entire circuitry should be properly insulated to prevent temperature differentials that would develop parasitic voltages from any remaining impurities, that cannot be eliminated from the circuitry.

The adjustable resistive elements in the dummy load circuit can be any suitable type, well-known to those skilled in the art; i.e., rheostats, potentiometers, banks of tapped resistive elements, etc. It should be emphasized, however, that these elements should be accurately made and consist of the same type of pure material that is used in the thermocouple circuit as will be explained in more detail hereinafter.

The preferred embodiment of the adjustable dummy load circuit is shown in block 17 of FIGURE 2. It has been found desirable to use the Wheatstone bridge principle to determine the dummy load requirement and banks of tapped resistive elements made of pure copper to develop the required resistance.

BUCKING VOLTAGE CIRCUIT

Block 19 is a bucking voltage circuit and is used in preliminary adjusting operations and in measuring operations.

The purpose of this circuit is to provide an accurate source of voltage during initial calibration procedure and to increase the sensitivity of the measuring circuit meter during actual measuring operations by bucking out the whole number value of microvolts so that the fractional value can be read to a sensitivity of 1 microvolt full scale (or the desired full scale reading).

During meter calibration, a small and extremely accurate and stable signal (usually 1 microvolt) is required. Due to the minute voltage involved, the circuitry must be guarded against voltage variations due to temperature changes caused by such things as wind, etc. The value of the resistor across which the test signal is to be developed must be accurately known and extremely stable, even under varying temperature conditions. In addition, the power source must also be accurately known and extremely stable and the over all circuitry must be capable of developing a relatively wide range of accurate bucking voltages during the measuring operation.

To accomplish the above-mentioned requirements, a stable source of power such as a mercury cell is used in conjunction with a temperature stable resistor whose value is accurately known and a network of accurately calibrated resistances such as suitable rheostats, potentiometers, banks of tapped resistive elements, etc. The stable resistor mentioned above must also have a minimum thermocouple effect when used with the copper (or other pure wire) portion of the circuitry. It has been found that a resistor made of Manganin is very suitable for this purpose. It should be pointed out that within the bucking circuitry only the portion of the bucking circuitry involved in generating the calibrating signal is critical so far as type of wire required is concerned. The circuitry involved in generating the initial calibration signal is required to be made of the same pure metal as that used in the thermocouple and the dummy load circuitry. The remainder of the wire in the bucking circuit can be of any conventional type for the reason that only large voltages are dealt with there (millions of microvolts) and, therefore, the existence of small spurious E.M.F.'s in terms of several microvolts have no effect on that part of the circuit.

The preferred embodiment of the bucking voltage circuit is shown in block 19, FIGURE 2.

D.C. AMPLIFIER-METER CIRCUIT

Block 27 is a highly accurate and stable D.C. amplifier and meter circuit.

The purpose of this circuit is to provide an instrumentation that is able to accurately measure minute voltages.

Impure metals and solder joints, when exposed to temperature differentials, produce spurious voltages in this portion of the measuring circuit which must be eliminated. After these spurious voltages are eliminated, the small voltages to be measured must be amplified (on the order of 100,000 to 1,000,000 times) to produce a current of sufficient strength to be read by an instrument such as a conventional milliammeter.

Again, the solution to the spurious voltage problem is to construct the critical circuits (those handling only a few microvolts) with pure metal such as pure copper, to insulate against temperature differentials as much as possible and to eliminate the remaining spurious voltages by the use of a bucking voltage or the like. The actual location of the bucking voltage source is not important as long as all spurious voltages in the critical portions of the measuring circuit are bucked out.

Figure 3:
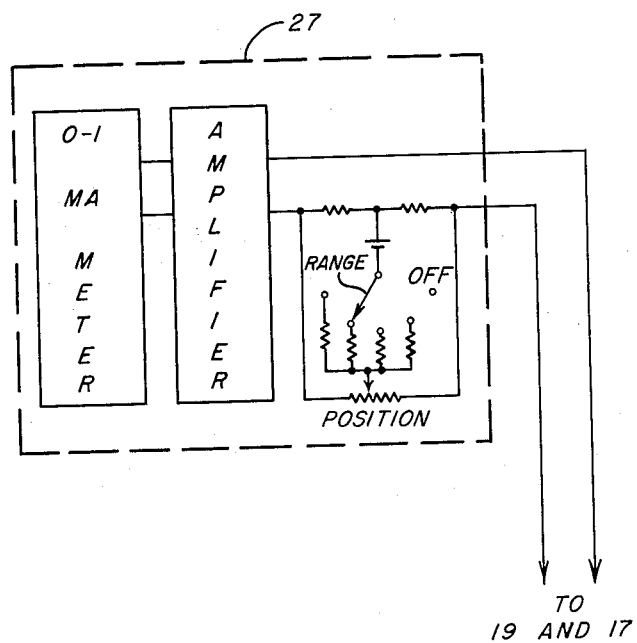
FIGURE 3 is a schematic diagram of the bucking voltage circuit in the preferred embodiment of the amplifier meter circuit.

A preferred embodiment of the D.C. amplifier-meter circuit is the "Liston-Becker" D.C. breaker amplifier model 14 shown in FIGURE 3. A conventional 0–1 milliammeter such as a "Weston"-type 301 can be used in conjunction with the "Liston-Becker" amplifier as shown in FIGURE 3.

Referring now to FIGURE 2, the preferred embodiment is used to illustrate, in detail, applicant's novel method of operation and its attendant advantages over the prior art.

The thermocouple circuit shown in detail in FIGURE 1 is shown in FIGURE 2 as block 41. In FIGURE 2, the adjustable dummy load circuit is shown in detail inside block 17 and the bucking voltage circuit is shown in detail inside block 19. The amplifier-meter circuit is shown by block 27 as a commercially available "Liston-Becker" D.C. breaker amplifier and an indicating meter.

The dummy load circuit, block 17, comprises ganged switches 59 with indicated "read" position 61, "calibrate" position 63, "balance" position 65, and "off" position 67; input lead posts 69 and 71; switch 73 which can be moved to any of eleven positions to pick off the desired resistance from tapped resistance bank 75; switch 77 which can be moved to any of eleven positions to pick off the desired resistance from tapped resistance bank 79; switch 81 which can be moved to any of eleven positions to pick off the desired resistance from tapped resistance bank 83; and resistors 49, 51, 53, 1.5 volt battery 55, and switch 57, which are a portion of the Wheatstone bridge.

All of the components in the dummy load circuit are made of pure copper, except the non-critical portions of the circuit; i.e., resistors 49, 51, 53, battery 55, and switch 57. The entire dummy load circuit (as well as the bucking voltage circuit to be described hereinafter) is housed in a cork container with walls ½ inch thick. The circuits are further insulated by placing a "Bakelite" container (walls ½ inch thick) around the cork container.

Bucking voltage circuit, block 19, includes mercury cell 85 developing a voltage of 1.353 volts; Manganin resistor 87 (.7391 ohm, ±1%); switch 89 adjustable to any of eleven indicated positions and capable of picking off the desired voltage in terms of one microvolt increments from tapped resistor bank 91; switch 93 adjustable to any of eleven indicated positions and capable of picking off the desired voltage in terms of ten microvolt increments from tapped resistor bank 95; and switch 97 adjustable to any of eleven indicated positions and capable of picking off the desired voltage in terms of 100 microvolt increments from tapped resistor bank 99. The Manganin resistor 87 is used in conjunction with mercury cell 85 and the one megohm resistor (in bank 91) to develop an extremely accurate and stable 1 microvolt signal for calibration purposes. Resistor 87 is also used in conjunction with cell 85 and resistor banks 91, 95, and 99 to develop the required bucking voltages during actual measurement as will be explained hereinafter. The precision Manganin resistor is used because of its low thermocouple effect and its low temperature coefficient.

The amplifier-meter circuit, block 27, FIGURE 3, is a "Liston-Becker" D.C. breaker amplifier model 14, well-known to those skilled in the art. As shown model 14 amplifier control panel contains a position range switch (coarse adjustment for the bucking voltage used in balancing spurious voltages), a position control switch (polarity and fine range adjust for the bucking voltage), a fine and coarse gain switch, a test signal switch in the amplifier circuit (not used in applicant's operation), and an "on-off" switch.

In operating the preferred embodiment shown in FIGURES 2 and 3, the following steps are performed:

Preliminary Operations

*Step 1.*—Move ganged selector switch 59 to the "off" position 67.

*Step 2.*—Turn power on in the "Liston-Becker" D.C. amplifier 27.

*Step 3.*—Connect thermocouple leads 101 and 103 to input terminals 105 and 107.

Selection of Dummy Load

*Step 4.*—Move ganged selector switch 59 to "balance" position 65.

*Step 5.*—Set D.C. amplifier 27 for a minimum gain and momentarily depress switch 57 which applies voltage 55 to the Wheatstone bridge circuit through resistor 53. After observing the meter action at 27, determine whether to increase amplifier sensitivity or adjust the value of the dummy load by switches 73, 77, and 81. Each time, after momentarily depressing switch 57, make alternate adjustments of the dummy load and amplifier sensitivity, repeating the process until a satisfactory null reading at 27 is obtained. This null reading indicates that the selected dummy load equals the resistance of the thermocouple circuit.

Calibration

*Step 6.*—Move gang selector switch 59 to the "calibrate" position 63. This action connects the dummy load across the input terminals at the same point in the circuit that the thermocouple leads will be connected to in Step 12.

*Step 7.*—Zero meter in block 27 (assuming switches 89, 93, and 97 are in the "zero" position) by adjusting the "Liston-Becker" position range and position control knobs with the coarse and fine gain controls at a setting of approximately 1 microvolt full scale sensitivity. This adjustment bucks out any spurious voltages developed within the total measuring circuit by utilizing a bucking voltage system within the "Liston-Becker" D.C. breaker amplifier instrument 27.

*Step 8.*—Move switch 89 to the 1 microvolt position and adjust the "Liston-Becker" fine and coarse gain controls for a full scale deflection of the meter connected to 27. This step places an accurate 1 microvolt test signal across Manganin resistor 87 to set the sensitivity of the meter connected to 27 for a 1 microvolt full scale reading. Thus, a more accurate calibration of the meter is made than would be possible if a test signal from the "Liston-Becker" instrument were used.

*Step 9.*—Move switch 89 to the "Zero" position.

*Step 10.*—Repeat the above-mentioned process until the meter reads "zero" with switch 89 in the zero position and 1 microvolt with switch 89 in the 1 microvolt position.

Measurement of Thermocouple Voltage

*Step 11.*—Decrease the "Liston-Becker" coarse gain. This step is necessary to protect the meter from the initial reading since the sensitivity of the meter is 1 microvolt full scale and the voltage to be measured will be in terms of several microvolts.

*Step 12.*—Replace the dummy load resistance with the thermocouple circuit by moving gang selector switch 59 to the "read" position 61.

*Step 13.*—Increase the "Liston-Becker" coarse gain knob until the meter goes off scale, then rotate switch 89 (93 and 97 if necessary) until the meter comes back on scale.

Repeat this operation until the "Liston-Becker" coarse gain is returned to its original position (prior to Step 11). With the proper adjustment of switches 89, 93, and 97, an accurate voltage is developed across Manganin resistor 87 which equals and cancels the whole number value of the thermocouple voltage being measured.

*Step 14.*—Read the measured voltage. The whole number value of the thermocouple voltage is the sum of the voltages indicated by switches 89, 93, and 97, and the fractional value is indicated on the meter connected to the "Liston-Becker" amplifier 27. The measured voltage is the sum of these readings.

Applicant's above-described method and device were used in a geothermal survey carried out in the vicinity of Lewisville, Texas. A series of nine holes, 120 feet in depth were drilled in the earth over an area 2,000 feet by 4,000 feet. Thermocouples such as shown in FIGURE 1 were positioned in each borehole so that one junction was located at a depth of 100 feet and the other at a depth of 120 feet. The holes and the thermocouple were covered up with wires 3 and 9, FIGURE 1, anchored and identified at the surface adjacent each hole. It was found that it required approximately sixty days before the bottom hole temperature reached equilibrium. Over a period of five months, a portable measuring circuit, such as shown in FIGURE 2, was used to record the temperature differentials at the borehole. The following temperature differentials were obtained over this period at the intervals indicated in the chart below. The readings are in microvolts where .04 microvolt equals a temperature differential of .001° C. The absence of measurements at certain positions was caused by weather conditions making particular locations inaccessible.

| Positions | Elapsed Time in Days | | | | | | |
|---|---|---|---|---|---|---|---|
| | 6 | 7 | 8 | 9 | 12 | 13 | 15 |
| L1A | | 11.88 | | 9.73 | | 7.90 | 7.39 |
| L2A | | 3.54 | 3.64 | 3.72 | | 3.88 | 3.90 |
| L3A | 5.36 | 4.61 | 4.16 | | 3.20 | 3.06 | 2.85 |
| L4A | 2.12 | 2.07 | 2.05 | | 1.95 | 1.98 | 1.95 |
| L5A | | .82 | .88 | .91 | | | |
| L6A | | 1.92 | 1.88 | 1.81 | | | |
| L7A | 3.98 | 3.48 | 3.24 | 3.04 | | | |
| L8A | 3.76 | 1.47 | 1.28 | 1.04 | .58 | .46 | .30 |
| L9A | .78 | .84 | .88 | .90 | .92 | .88 | .90 |

| Positions | Elapsed Time in Days | | | | | | |
|---|---|---|---|---|---|---|---|
| | 16 | 20 | 21 | 22 | 23 | 28 | 29 |
| L1A | 7.22 | 6.60 | 6.52 | | 6.33 | | 6.00 |
| L2A | 3.86 | 3.90 | 3.94 | | 3.96 | | 3.94 |
| L3A | 2.76 | | | | | 2.33 | |
| L4A | 1.91 | | | | | 1.80 | |
| L5A | | | | 1.11 | | | .99 |
| L6A | | | | 1.83 | | | 1.92 |
| L7A | | 2.65 | | 2.65 | | | 2.60 |
| L8A | | | | 0 | | −.28 | |
| L9A | | | | .94 | | .93 | |

| Positions | Elapsed Time in Days | | | | | | | |
|---|---|---|---|---|---|---|---|---|
| | 36 | 43 | 50 | 54 | 61 | 82 | 90 | 150 |
| L1A | 5.72 | 5.51 | 5.37 | | 5.22 | | 5.40 | |
| L2A | 4.02 | 4.11 | 3.95 | | 3.84 | | 3.92 | |
| L3A | 2.14 | 2.09 | 2.05 | | 1.98 | | 1.88 | |
| L4A | 1.71 | 1.71 | 1.66 | | 1.62 | | 1.53 | |
| L5A | 1.02 | .96 | | .96 | | | | .92 |
| L6A | 1.90 | 1.82 | | 1.84 | | | | 1.80 |
| L7A | 2.57 | 2.51 | | 2.52 | | | | 2.43 |
| L8A | −.40 | −.46 | | −.52 | | −.62 | | −.78 |
| L9A | .90 | .86 | | .82 | | | | .67 |

It is to be understood that the examples and specific apparatuses shown and described herein shall not be construed as limiting the scope of the instant invention, but that certain variations thereof will be apparent to those skilled in the art. For example, it is known to those skilled in the art that the measured temperature differentials referred to herein may be recorded in the laboratory or in various types of industrial operations requiring fast, accurate, and dependable temperature differential measurements. Although the method and apparatuses have been illustrated in downhole operations, it is obvious that the same outstanding characteristics of the invention make it just as appropriate for the above-mentioned laboratory and industrial operations.

I claim:

1. A method of accurately measuring a minute natural temperature differential between two points in a borehole drilled in a subsurface formation with a thermocouple circuit including copper wires and constantan wire and a rugged, portable measuring circuit comprising the steps of
    (A) minimizing the generation of spurious E.M.F. in the thermocouple circuit by positioning the constantan wire in said thermocouple circuit between the two points in said borehole,
    (B) fixing two ends of said thermocouple circuit to the surface above the borehole,
    (C) re-establishing the temperature gradient naturally existing between said two points in said borehole before said borehole was drilled,
    (D) connecting the portable measuring circuit to said two ends of said thermocouple circuit,
    (E) adjusting a dummy load resistance to equal the total resistance of said thermocouple circuit,
    (F) bucking out spurious E.M.F.'s in the measuring circuit when said dummy load resistance is connected to said measuring circuit,
    (G) replacing said dummy load with said thermocouple circuit, and
    (H) obtaining an accurate measurement of the small temperature differential between said two points by introducing a known bucking voltage equal to the whole number value of the voltage developed by said temperature differential and measuring the fractional value voltage with said measuring circuit.

2. A rugged, easily used geothermal exploration device for measuring minute, natural temperature gradients in a borehole drilled in a subsurface formation comprising
    (A) a thermocouple means including
        (1) first metallic wire spanning the distance between two preselected points in said borehole at which small temperature differentials may exist,
        (2) second and third metallic wires of a metal dissimilar from said first metal and electrically connected at one end to the terminals of said first wire, said second and third wires being greater in length than said first wire,
    (B) an uphole, rugged, portable measuring means positioned remote from the terminals of said first wire and connected to the other ends of said second and third wires including
        (1) an adjustable dummy load means comprising
            (a) a plurality of switches,
            (b) a plurality of variable resistances connected in series to produce an accurate variable total resistance, said variable resistances connected to at least one of said switches,
            (c) means for matching said variable total resistance of said plurality of variable resistances to the resistance of said thermocouple circuit, said means including a battery, a plurality of resistors and at least a portion of said switches,
        (2) a bucking voltage circuit connected to at least one of said switches comprising
            (a) a stable, precise, adjustable resistive means,
            (b) a stable known D.C. voltage source, and
            (c) a stable, accurate low resistance resistor, said D.C. voltage source connected between said adjustable resistive means and said low resistance resistor, and
        (3) an amplifier meter means, said amplifier meter means connected through said stable, accurate low resistance resistor to at least one of said switches.

3. In a device as set forth in claim 2 wherein the D.C. voltage source is a mercury cell battery and the stable, precise, adjustable resistive means includes a plurality of banks of tapped resistors.

4. In a device as set forth in claim 2 wherein the amplifier meter means includes a "Liston-Becker" D.C. breaker amplifier.

References Cited in the file of this patent
UNITED STATES PATENTS

| | | |
|---|---|---|
| 2,083,408 | Stein | June 8, 1937 |
| 2,311,757 | Jakosky | Feb. 23, 1943 |
| 2,403,704 | Blau | July 9, 1946 |
| 2,473,627 | Wickizer et al. | June 21, 1949 |
| 2,659,861 | Branson | Nov. 17, 1953 |
| 2,673,465 | Goodman et al. | Mar. 30, 1954 |

UNITED STATES PATENT OFFICE
CERTIFICATE OF CORRECTION

Patent No. 3,122,016 February 25, 1964

Glenn W. Fordham

It is hereby certified that error appears in the above numbered patent requiring correction and that the said Letters Patent should read as corrected below.

Column 7, lines 72 and 73, strike out "in the amplifier circuit"; line 72, after "gain switch" insert -- in the amplifier circuit --.

Signed and sealed this 4th day of August 1964.

(SEAL)
Attest:

ERNEST W. SWIDER
Attesting Officer

EDWARD J. BRENNER
Commissioner of Patents